Oct. 22, 1963  C. L. GUSTAFSON  3,107,475
NUT HARVESTING AND SEPARATING MACHINE
Filed May 12, 1960  4 Sheets-Sheet 1
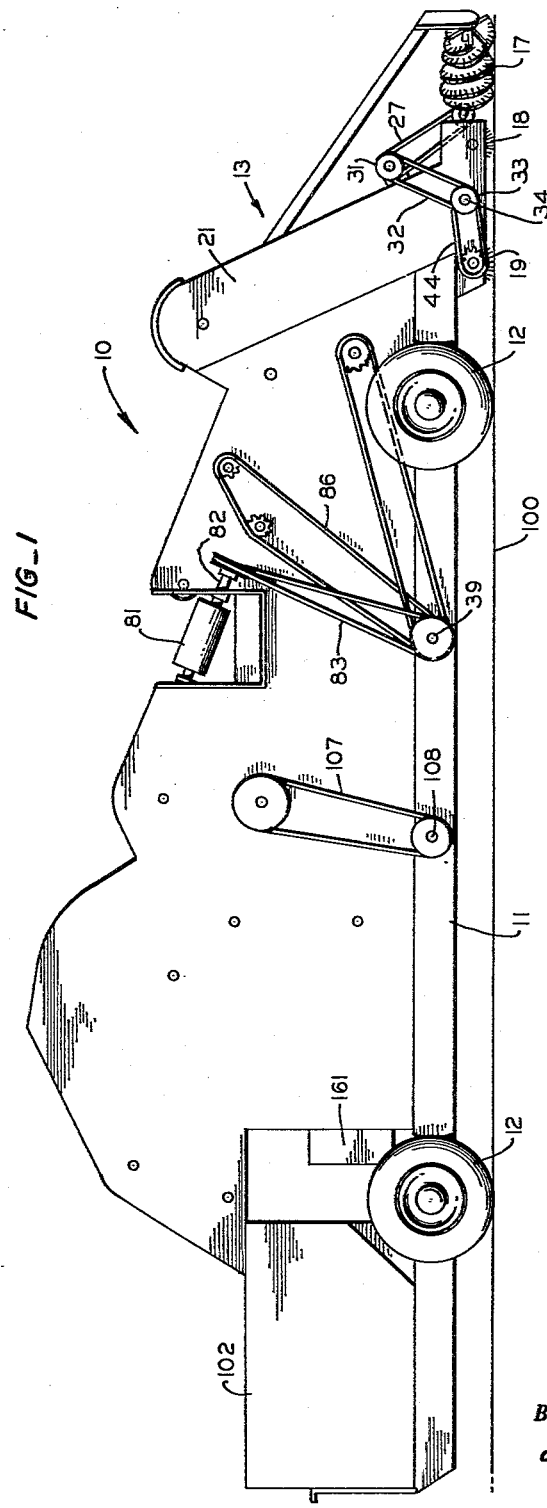
INVENTOR.
CARL L. GUSTAFSON
BY Lothrop & West
ATTORNEYS Oct. 22, 1963　　　C. L. GUSTAFSON　　　3,107,475
NUT HARVESTING AND SEPARATING MACHINE
Filed May 12, 1960　　　　　　　　　　　4 Sheets-Sheet 2
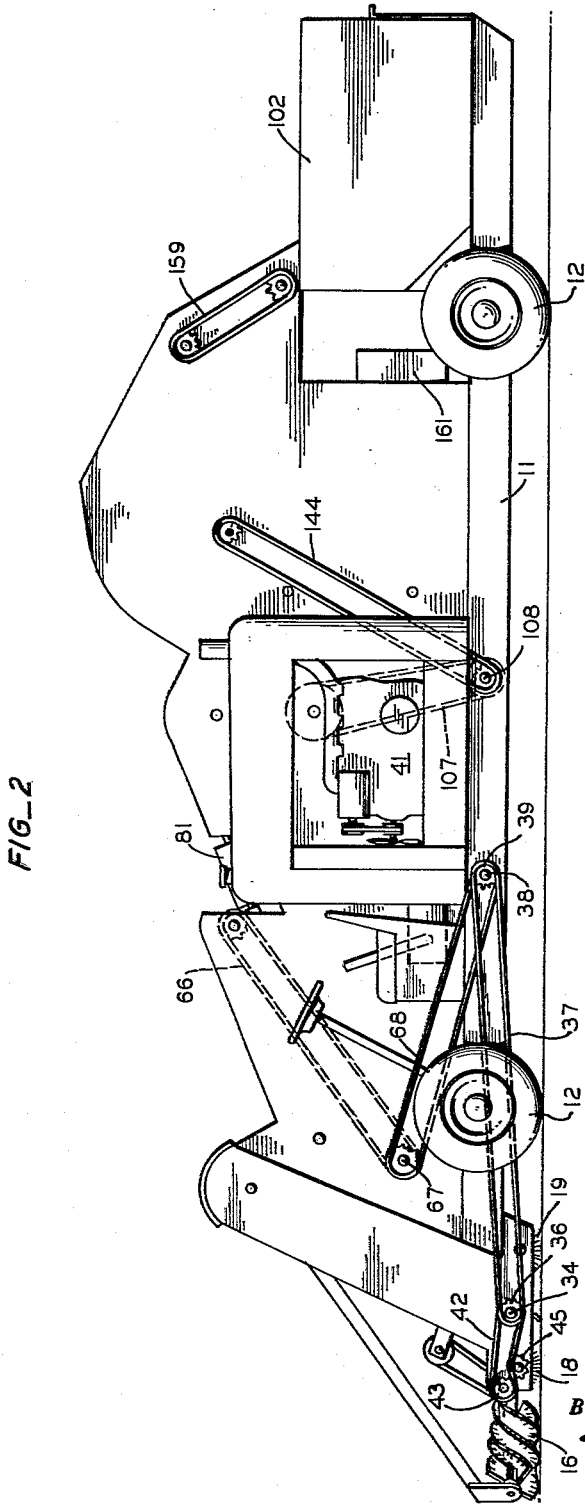
INVENTOR.
CARL L. GUSTAFSON
BY Lothrop & West
ATTORNEYS

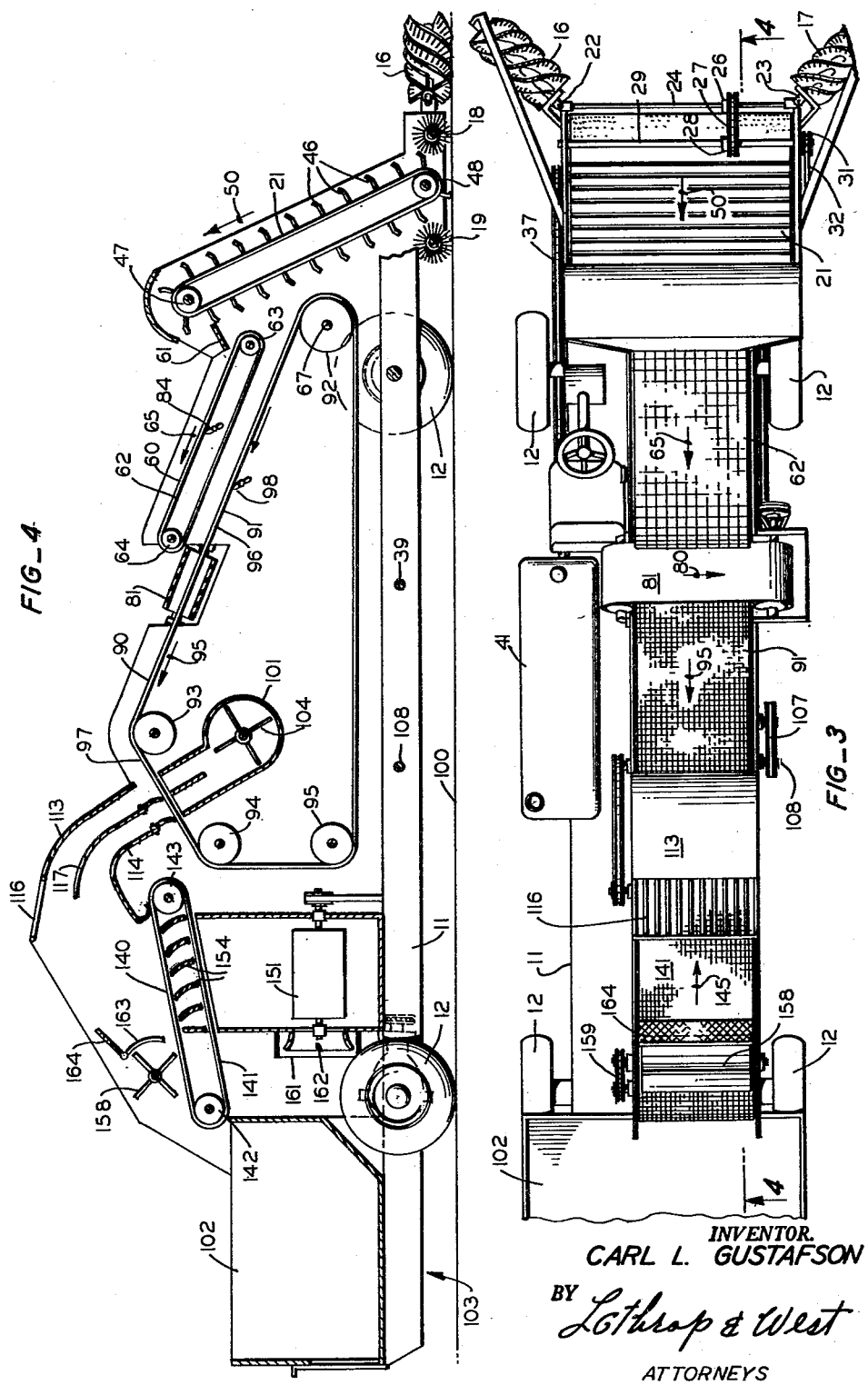

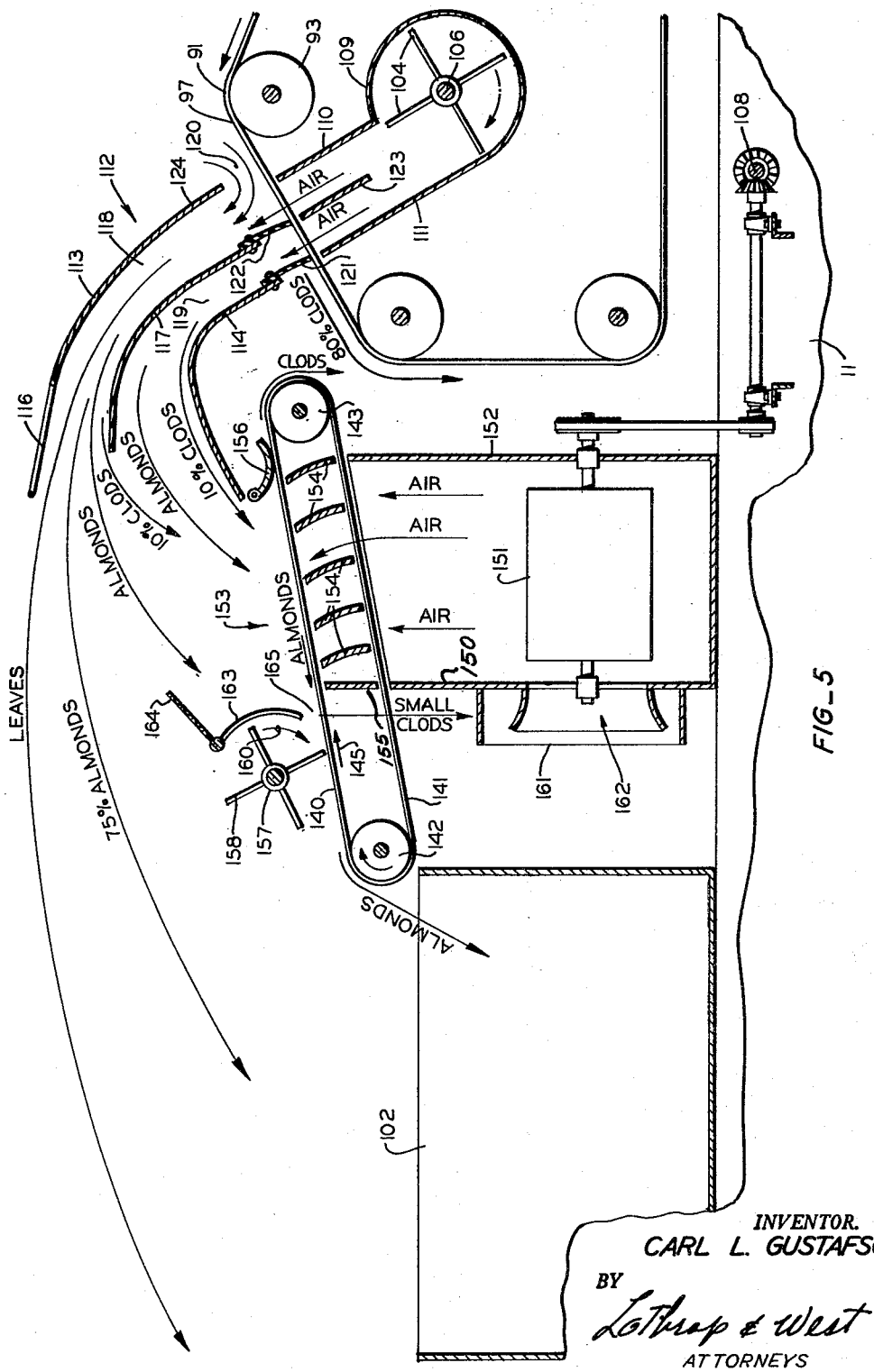

United States Patent Office 3,107,475
Patented Oct. 22, 1963

3,107,475
NUT HARVESTING AND SEPARATING MACHINE
Carl L. Gustafson, Winters, Calif., assignor of fifty percent to William H. Roeber, Winters, Calif.
Filed May 12, 1960, Ser. No. 28,675
13 Claims. (Cl. 56—328)

The invention relates to machines for separating nuts and other crops, such as prunes and olives, from unwanted material associated therewith, such as clods, leaves and twigs.

Nut harvesters of the kind heretofore available have effected only partial separation, the end product being intermixed with substantial amounts of unwanted material requiring further handling, such as bagging, followed by separation at a location remote from the area being harvested. Not only is the rising cost of labor making this practice uneconomical, but many people are required to accomplish the result.

It is therefore an object of the invention to provide a nut harvesting machine which is capable of harvesting substantially the total crop which has fallen to the ground and is disposed in the path of the machine.

It is another object of the invention to provide a crop separating machine which effects substantially total separation between the crop and attendant unwanted material.

It is still another object of the invention to provide a nut harvesting apparatus which is capable of being operated by only one person.

It is yet another object of the invention to provide a harvesting machine which is capable of storing a large quantity of the separated crop and which thereby obviates the need to make frequent unloading trips.

It is a further object of the invention to provide a crop handling apparatus which is extremely efficient, yet whose operation and use can be quickly learned even by a relatively unskilled person.

It is a still further object of the invention to provide a nut harvesting machine wherein the separated crop is clean enough to be introduced directly into the hulling operation.

It is yet a further object of the invention to provide a harvesting machine in which the separation or litter products, such as dirt, clods, leaves and twigs, are returned to the ground, in situ, a result much to be desired by careful and economical farming practices.

Other objects, together with the foregoing, are attained by the embodiment described in the following description and shown in the accompanying drawings in which:

FIGURE 1 is an elevational view of the right-hand side of the machine, when looking forwardly;

FIGURE 2 is an elevational view of the left-hand side of the machine;

FIGURE 3 is a plan view, a portion of the storage bin being cut away to reduce the extent of the figure;

FIGURE 4 is a vertical, longitudinal section, the plane of section being indicated by the line 4—4 in FIGURE 3; and FIGURE 5 is a fragmentary sectional view, to an enlarged scale, of the nut separating station of the machine.

While the nut harvesting machine of the invention is susceptible of numerous physical embodiments, depending upon the environment and requirements of use, at least one of the herein shown and described embodiments has been made and used, and has performed in an eminently satisfactory manner.

The nut harvesting machine of the invention, generally designated by the numeral 10, includes an elongated frame 11 mounted on a plurality of ground engaging wheels 12 for advancing along a determined path, such as a windrow strewn with nuts. The front or forward end 13 of the machine is shown in FIGURES 1, 3 and 4 as oriented toward the top of the drawing; and in FIGURE 2, toward the bottom of the drawing. At this end there is provided structure, here shown as including ground engaging rotary brushes 16, 17, 18 and 19, and an upwardly and rearwardly inclined conveyor belt 21, for collecting, picking up and introducing into the machine all of the nuts located above mean ground level in the path of advance of the machine, as well as various pebbles, clods, twigs and leaves associated therewith. The brushes 16 and 17 are inclined to the vertical longitudinal plane of the machine and are mounted and supported to diverge forwardly of the frame 11 so as to sweep a path broader than the body of the machine and to channel and concentrate the swept material toward the centerline of the machine. Each brush rotates forwardly at its zone of contact with the ground, and is preferably formed to a helical shape so as to urge the swept matter rearwardly with relation to the machine as well as inwardly.

The brushes 16 and 17 are driven through a transmission system including universal joints 22 and 23 at the ends of a common shaft 24, and through a sprocket wheel 26, a chain belt 27, a sprocket wheel 28, a shaft 29, a wheel 31, a belt 32, a sprocket wheel 33, a shaft 34, a sprocket wheel 36 (see FIGURE 2), a chain belt 37, a sprocket wheel 38, and a shaft 39. The shaft 39 is in turn driven, through connections not shown, by an engine generally designated by the reference numeral 41, this engine also being the main power source of the machine, both for motive power in a manner well known in the art, and for driving the operating parts of the apparatus.

The brush 18 is mounted transversely to the length of the machine and is located between the brushes 16—17 and the conveyor belt 21. The brush 18 rotates rearwardly at its zone of engagement with the ground so as to urge material collected by the brushes 16—17 backwardly onto the conveyor belt 21. The brush 18 is driven by a chain belt 42 stretched between an idler wheel 43 and the shaft 34, the belt being reaved over a sprocket 45 mounted on the brush 18 shaft (see FIGURES 1, 2 and 4).

The brush 19 is similarly mounted and is located rearwardly of the lower end of the conveyor belt 21. The brush 19, however, rotates forwardly at its zone of contact with the ground, so as to urge material that has been missed by the conveyor belt forwardly toward the brush 18 and thence to the belt 21. The brush 19 is conveniently driven by a chain belt 44 from the shaft 34 (see FIGURE 1).

The conveyor belt 21 is mounted with its width transverse to the length of the machine and is formed with a plurality of transverse scoops 46 or flights rotating forwardly at their zone of engagement with the ground, and upwardly and rearwardly thereafter in the direction indicated by the arrow 50. The belt rotates between an upper drum 47 and a lower drum 48, the lower drum 48 being mounted on the shaft 34 and being driven thereby.

The flights 46, rotating rearwardly over the top side of the upper drum 47, discharge their loads onto a downwardly and rearwardly directed slide 61, which in turn empties onto a first screening belt 62, the upper run 60 of which travels upwardly and rearwardly, in the direction indicated by the arrow 65, between a pair of drums 63 and 64. The live drum 64 is driven (see FIGURE 2) through a drive belt 66, a shaft 67, and a drive belt 68 from the shaft 39.

The first screening belt 62 is provided with a large mesh (see FIGURE 3) adapted to support objects larger in size than nuts. The upper run 60 of the belt 62, rotating rearwardly over the drum 64, discharges such larger objects downwardly onto a conveyor belt 81, the upper run of which moves transversely to the length of the machine in the direction of the arrow 80 and is adapted to discharge such unwanted larger objects laterally to the ground. The belt 81 is driven through a shaft 82 and a drive belt 83 from the shaft 39. The first screening belt 62 is agitated or vibrated in motion by a rotating paddle-wheel or thumper 84, driven by a drive belt 85 from the shaft 39, so that nuts and other objects of the same or smaller size range are shaken downward through both the upper and lower runs of the belt 62 and onto a second foraminous or screening belt 91 disposed below the first screening belt 62. Carried onwardly by the belt 62 are objects such as branches, twigs and large leaves. Falling onto the second screening belt are such objects as nuts, small clods and pebbles and leaves. Dust and similar particles fall through the belt 91 to the ground 100.

The second screening belt 91 rotates on a set of drums 92, 93, 94 and 95, the drum 92 being mounted on the shaft 67 which forms the drive for the belt 91. The upper run 90 of the belt 91 is functionally divided between an upwardly and rearwardly moving portion 96 between the drums 92 and 93 and which includes the portion located below the first belt 62 and passing through the runs of the conveyor belt 81 (see FIGURE 4), and a downwardly and rearwardly moving portion 97 between the drums 93 and 94. The second belt 91, with its upper run moving in the direction of the arrow 95, is provided with a mesh adapted to render it capable of supporting nuts but incapable of supporting objects substantially smaller than nut size. This belt 91 is also agitated in motion by a paddle-wheel or thumper 98, driven by the belt 86, so that such smaller objects are dislodged from the mesh and are shaken downward through both runs of the belt and through the frame 11 to the ground.

It will be seen that the material arriving on the portion 97 of the upper run of the belt 91 includes all of the nuts, together with certain other objects, principally including earth clods and twigs and leaves small enough to have passed through the belt 62 but too large to have passed through the belt 91. Generally, these other objects are of a size range corresponding to that of the nuts and slightly larger and smaller, because the mesh sizes of the belts 62 and 91 must be established so as to pass and retain nuts of all sizes within the natural growing size range. The other objects, however, have different specific gravities than the nuts, or, in other words, different weights or masses for the same size, volume or surface area.

Accordingly, there is mounted on the frame 11 and below the run 97 structure, here shown as including a fan or air blower 101, for delivering a flow of air directed upwardly and rearwardly through the belt 91, the moving belt 91 serving as a means for introducing the mixed nuts and other objects into the air flow. All of the nuts and at least a portion of the other objects are impelled upwardly and rearwardly by the jet in diverging curved "ballistic" trajectories, as illustrated most clearly in FIGURE 5.

The nuts, being generally heavier than twigs and leaves per unit volume or surface area, but lighter than earth clods of the same dimensions, and the total force applied to the nuts and objects by the air being a function of the surface or cross-sectional areas thereof, the nuts receive generally smaller impulses and traverse shorter trajectories than the leaves and twigs, and receive greater impulses and traverse longer trajectories than the earth clods, and are thus separated from both. An open-topped bin 102 is mounted on the after or rearward end 103 of the frame 11 at a location such as to receive and store the nuts impelled by the air blast.

The fan or air blower 101 is here shown (see FIGURES 1 and 5) as including a plurality of fan blades 104 rotating on a shaft 106 driven by a drive belt 107 from a shaft 108, the latter shaft being separately driven by the engine 41 preferably through a gearing arrangement (not shown) permitting selective adjustment of the fan to one of a range of rotational speeds and maintaining of the selected speed at the chosen value regardless of the rate of movement of the machine forwardly along the nut-strewn path and regardless of the rate of rotation of the shaft 39, which drives the forward belts and brushes.

Enclosing the fan blades 104 is a housing 109 opening in an air spout or nozzle 111 directed upwardly and rearwardly toward the run 97 of the belt 91. On the upper side of the run 97 is mounted a further housing 112 including a forward wall 113 and a rearward wall 114 defining a conduit in substantial alignment with the direction of air flow from the fan 101 and the nozzle 111 thereof. The walls 113 and 114 are curved divergingly rearwardly to define the maximum and minimum trajectories of nuts and objects blown by the fan from the belt 91, the walls terminating at locations substantially spaced from the forward end of the bin 102. The upper and most nearly horizontal portion of the wall 113 is formed as a grille 116 (see FIGURES 3 and 5) permitting the passage of small leaves, twigs and other objects smaller than nuts, but preventing the passage of nuts upwardly therethrough and dispersing the air passing upwardly along the wall 113.

An intermediate wall 117 is also provided between the walls 113 and 114, the wall 117 being intermediate in curvature with respect thereto and defining therewith a pair of channels 118 and 119 for conducting the air flow from the fan 101. The walls 114 and 117 are each formed with a resilient flap 121 and 122, respectively, extending forwardly and downwardly into engagement with the belt 91, these flaps being resiliently ineffective to prevent movement therethrough of objects on the belt 91 but being effective to channel the flow of air from the fan 101 through the respective channels 118 and 119. An intermediate wall 123 is also provided in the nozzle 111 in alignment with the wall 117 and the flap 122 to initiate the separation of air flow into the two channels 118 and 119. The forward and lower end 124 of the wall 113 is spaced substantially from the run 97 of the belt 91 to form a gap 120 permitting the passage of nuts and objects on the belt, and is flared somewhat forwardly of the line of prolongation of the forward wall 110 of the nozzle 111, to create a venturi effect or "suction" so that leaves will enter the air stream. Very little air flow, however, is permitted through the flaps 121 and 122, with the result that an air velocity and pressure differential is created between the channels 118 and 119, the different concurrent air velocities and pressures in the flows of the two channels being effective in achieving a greater degree of separation of the blown nuts from the blown other objects than could otherwise be obtained.

The degree of separation obtained between the nuts and other objects blown rearwardly by the fan 101 is a function of the various specific gravities involved, as previously seen, and of the range of sizes of the nuts, and of the air velocity or pressure used to impel them. Given a predetermined array of specific gravities in the materials that the machine is selected for separating, and a predetermined range of nut sizes, then greater or lesser degrees of separation, including in some instances even complete separation, may be obtained by establishing the air velocity or pressure at an appropriate value.

The establishment of different air pressures in the channels 118 and 119 results in providing a differential separation of the nuts and other objects blown therethrough, and has been found in actual practice to provide a greater degree of separation in the total flow of material from the arcuate housing 112.

As another important feature of the invention, the fan 101 is selectively adjustable to provide a range of values for the impelling air velocity or pressure in the jet, as by adjusting the rotational speed of the fan through the drive belt 107 and the shaft 108, or otherwise, so that in preparing the machine for use with crops of a particular size-range and known specific-gravity characteristics, the machine may be adjusted to provide the maximum possible separation therefor. As heretofore indicated in connection with the description of the engine 41 and the shaft 108, the shaft 108 is driven by the engine 41 preferably through a gearing arrangement (not shown) permitting selective adjustment of the fan speed. Thus, while the engine 41 drives the fan, the actual speed of the fan is determined by the setting which the operator imposes on the interposed gearing, which can be any one of numerous, commercially available speed-changing devices.

For use with crops wherein the maximum separation with the structure heretofore described is less than complete separation, a third screening belt 141 is provided between the bin 102 and the second screening belt 91. The third belt 141 slightly underlies the rearward end of the housing 112, so as to receive the unseparated portion of the nuts and other objects blown rearwardly by the fan 101. The belt 141 travels so that its upper run 140 moves forwardly and upwardly, in the direction of the arrow 145, between a pair of drums 142 and 143, the drum 143 being driven through a drive belt 144 from the shaft 108 (see FIGURE 2). The inclination of the belt 141 is preferably slight, for example in the neighborhood of fifteen to eighteen degrees from the horizontal, so as to provide a gentle gravitational movement of the nuts located thereon downwardly and rearwardly toward the bin 102. The mesh of the belt 141 is sufficiently small to support all of the nuts thereon.

Beneath the belt 141 is mounted a second fan or air blower 151 enclosed in a housing 152 having a nozzle or outlet 153 directing a flow of air upwardly and rearwardly through the belt 141 continuously to dislodge the nuts thereon and urge them by gravity to move toward the bin, without at the same time dislodging clods and other objects of higher specific gravities. The latter objects are carried off forwardly by the belt and dropped through the frame 11 to the ground.

The outlet 153 of the housing 152 is provided with a plurality of substantially identical vanes 154, or louvers, curved upwardly and rearwardly for directing the air flow as desired through the belt; and the fan 151 is driven through a suitable drive belt from the shaft 108. Located rearwardly from the aftermost one of the vanes 154 is the upward continuation of the rear wall of the housing 152. As appears most clearly in FIG. 5, the rear wall 150 of the housing 152 is vertical and terminates at a location spaced a short distance below the lower run of the belt 141; and located between and spaced a short distance from the upper and lower runs of the belt 141 is a vertical upward continuation 155, or extension of the rear wall 150.

An arcuate plate 156 is pivotally mounted on a horizontal axis disposed adjacent the after end of the after wall 114 of the conduit housing 112, the plate 156 being urgeable by gravity into contact with the belt 141 and being urgeable away from the belt 141 by objects carried under the plate by the belt. The swingable plate is particularly disposed so as to overlie the forward portion of the airstream from the fan 151 so that the air velocity adjacent the plate is locally increased for last-chance separation of nuts and clods at that point on the run of the belt 141. The increased velocity is adequate to lift and urge the nuts rearwardly but is ineffective to dislodge the heavier articles such as clods and pebbles. Also, at the other, rearward end of the belt run and adjacent the bin 102 there is rotatably mounted a paddle wheel 157 including a plurality of sweeps 158 movable toward the bin in the direction of the arrow 160 and adjacent the belt 141 for sweeping nuts dislodged from the belt and urged rearwardly thereon into the bin.

A shield 161 is provided over the air-intake 162 of the fan 151 for protecting the intake from dirt and small clods dropping downwardly from the belt 141; and an arcuate shield 163, including a screen portion 164, is provided just forward of and somewhat above the paddle wheel 157 to deflect nuts downwardly toward the gap 165 between the bottom of the plate 163 and the belt run 140. The screen 164 is rotatably adjustable to permit selective interception of the almonds and the clods. The intercepted nuts and clods are directed downwardly toward and tend to gather adjacent the gap 165, or throat, and are there acted upon by the combined operation of the belt and the air stream.

It will be understood that the fan 151 and the belt 141 operate in somewhat the same manner as the fan 101 and the belt 91, except that the air pressure and velocity of the fan 151 is adjusted to be much less than that of the fan 101, and the inclination and direction of belt movement is at variance. The effect is that the clods on the belt 141 are not blown off or disturbed, and the nuts are not blown off. Instead, the nuts are rather gently and repeatedly dislodged and lifted to roll or move downwardly on the belt toward the bin. Concurrently, the larger and heavier clods are carried forwardly and dumped.

It is also to be noted that directly to the rear of the most rearwardly located louvers 154 is an area which is intentionally isolated from the air stream caused by the fan 151. This area of dead air space is for the purpose of allowing any dirt or small clods in the area to sift through the belt 140 into the area in which the numeral 141 in FIGURES 4 and 5 is located, and thence to the ground. This additional separation feature is of great practical importance, serving both as a separation refinement and as a device for reducing the amount of dust and dirt arising from the operation of the machine.

There are practically no leaves or twigs on the belt 141, these having all been blown away by the fan 101. Although not precise, the percentage values of the nuts and other objects in following various paths, and which are shown in FIGURE 5, are quite close to the mean values found in field use of the crop separating device of the invention. It can be seen that separation of the nuts is extremely efficient, and it can also be seen that unwanted objects such as leaves, twigs, clods, etc., are returned to the ground in approximately their original location, thus not only eliminating the need for special trips in carrying such material back to the fields as has heretofore been required, but also the need for great additional labor and capital expenditure, such as a cleaning device at the processing plant, which would otherwise be necessary.

What is claimed is:

1. In a nut harvesting machine having a wheel-supported frame for movement along a path strewn with nuts, a first foraminous conveyor of large mesh adapted to hold objects larger than nuts, and means for carrying nuts, clods and twigs from the ground to said first belt, the improvement comprising: a second foraminous conveyor below said first conveyor to receive and retain objects of about nut size and being of a mesh size incapable of retaining objects substantially smaller than nuts; a fan located below a portion of said second conveyor and means for directing air from said fan obliquely upwardly through said second conveyor at such velocity as to blow material including leaves, twigs, nuts and clods obliquely upwardly therefrom and form a stream of said material, an upper layer of which consists essentially of only leaves, twigs and nuts and a next lower layer of which comprises a mixture of nuts and clods; bin means positioned to receive only said nuts from said upper layer; means for intercepting said next lower layer and for separating said nuts therein from the clods therein and delivering said nuts to said bin.

2. A machine as defined in claim 1 including wall means defining the boundaries of said upper and next lower layers; the wall means defining the upper and lower boundaries of said next lower layer including flexible portions extending to said second conveyor; and means for directing separate streams of air from said fan to said second conveyor along paths respectively aligned with said upper and next lower layers.

3. A machine as defined in claim 2 wherein the wall means defining the upper boundary of said upper layer terminates at one end in an edge spaced from said second conveyor at its other end in a plurality of spaced parallel fingers whereby to direct leaves and twigs in said upper layer along different trajectories from nuts therein.

4. A machine as defined in claim 1 wherein said last-named means includes foraminous means for conveying a layer of said mixture along an upwardly sloping path; and means for blowing a stream of air upwardly through said foraminous means with only sufficient force to dislodge and partially suspend said nuts whereby said nuts gravitate downwardly along said path while said clods are carried upwardly along said path.

5. In a nut harvesting machine, means for separating nuts from clods of earth, comprising; a foraminous conveyor for conveying a layer of a mixture of nuts and clods along an upwardly sloping path; means for directing a stream of air upwardly through said conveyor in an upper region of said path with only sufficient force to dislodge and partially suspend said nuts whereby said nuts gravitate downwardly to a lower quiescent region of said path; and means for forcibly removing said nuts from said conveyor at said lower region.

6. A machine as defined in claim 5 wherein said means for directing said stream of air includes vane means below said conveyor for directing said air upwardly through said conveyor in a direction at least partially rearwardly of said path whereby to dislodge said nuts in a direction to assist gravitation thereof downwardly of said path.

7. A machine as defined in claim 5 including wall means having a lower edge spaced upwardly from said conveyor at the lower boundary of said upper region.

8. A machine as defined in claim 5 including deflector means above said conveyor at the upper boundary of said upper region arranged to deflect a portion of said stream of air sharply downwardly along said path to forcibly assist downward gravitation of nuts approaching said upper boundary.

9. The method of harvesting and cleaning nuts comprising the steps of: gathering a mixture of fallen nuts, clods of earth, leaves and twigs; screening said mixture to remove therefrom substantially all objects materially larger than said nuts and a major portion of material appreciably smaller than said nuts; advancing a layer of said screened mixture continuously along a predetermined path; blowing a stream of air upwardly through said layer and with sufficient force to project all said nuts and the clods of comparable size or weight along a trajectory oblique to the vertical whereby said projected mixture stratifies to form an upper layer consisting only of nuts and a lower layer comprising a mixture of nuts and clods; directing the nuts in said upper layer to a collection zone; intercepting said lower layer and directing the mixture to a separating station; separating the remaining nuts from the clods at said separating station and directing said nuts to said collection zone.

10. The method of claim 9 wherein said step of separating the remaining nuts from the clods comprises; advancing a layer of said mixture in one direction along a fixed path; directing a stream of air upwardly through said layer with only sufficient force to dislodge and partially suspend said nuts; and simultaneously causing said nuts to move along said path in a direction opposite said one direction whereby said nuts and said clods leave said separating station from opposite sides thereof.

11. The method of separating nuts from a mixture of nuts and clods of earth of comparable size comprising the steps of: conveying a layer of said mixture along a path sloping upwardly in the direction of movement; directing a stream of air upwardly through said layer with only sufficient force to dislodge and partially suspend said nuts whereby said nuts gravitate along said path in a downward direction opposite the direction of movement; and collecting said nuts in a lower region of said path.

12. The method of claim 11 wherein a stream of air is directed upwardly through said layer and rearwardly oblique to the vertical whereby to assist said gravitation of said nuts.

13. The method of claim 11 including the step of shaply deflecting a portion of said stream of air, above said layer and adjacent the upper end of said path, rearwardly to insure rearward gravitation of nuts approaching said upper end.

References Cited in the file of this patent

UNITED STATES PATENTS

| | | |
|---|---|---|
| 555,533 | Randolph | Mar. 3, 1896 |
| 620,731 | Best | Mar. 8, 1899 |
| 1,082,191 | George | Dec. 23, 1913 |
| 1,808,928 | Lint | June 9, 1931 |
| 2,010,335 | Stoltenberg | Aug. 6, 1935 |
| 2,151,894 | Cambessedes | Mar. 28, 1939 |
| 2,226,009 | Miller | Dec. 24, 1940 |
| 2,373,426 | Spafford | Apr. 10, 1945 |
| 2,594,776 | Hiatt | Apr. 29, 1952 |
| 2,679,133 | Soderholm | May 25, 1954 |
| 2,721,656 | Goodwin | Oct. 25, 1955 |
| 2,861,298 | Fowler | Nov. 25, 1958 |
| 2,943,430 | Carruthers | July 5, 1960 |
| 2,950,720 | Sheard | Aug. 30, 1960 |

FOREIGN PATENTS

| | | |
|---|---|---|
| 811,255 | Great Britain | Apr. 2, 1959 |